United States Patent
Johnson et al.

(10) Patent No.: US 8,982,041 B2
(45) Date of Patent: Mar. 17, 2015

(54) MOVING PARTICLE DISPLAY DEVICE WITH INTERMEDIATE DRIVE ELECTRODE

(75) Inventors: Mark Thomas Johnson, Eindhoven (NL); Franciscus Paulus Maria Budzelaar, Eindhoven (NL); Murray Fulton Gillies, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1362 days.

(21) Appl. No.: 12/377,606

(22) PCT Filed: Jul. 30, 2007

(86) PCT No.: PCT/IB2007/053005
§ 371 (c)(1),
(2), (4) Date: Feb. 16, 2009

(87) PCT Pub. No.: WO2008/020355
PCT Pub. Date: Feb. 21, 2008

(65) Prior Publication Data
US 2010/0171768 A1    Jul. 8, 2010

(30) Foreign Application Priority Data
Aug. 15, 2006  (EP) .................................... 06118965

(51) Int. Cl.
*G09G 3/34* (2006.01)
*G09G 5/00* (2006.01)
*G09G 5/10* (2006.01)
*G02F 1/167* (2006.01)
*G02F 1/1343* (2006.01)

(52) U.S. Cl.
CPC .............. *G02F 1/167* (2013.01); *G09G 3/3446* (2013.01); *G02F 1/134363* (2013.01); *G09G 2300/0434* (2013.01); *G09G 2320/0252* (2013.01)
USPC ............................ 345/107; 345/215; 345/690

(58) Field of Classification Search
CPC ................ G09G 3/344; G09G 3/3446; G09G 2300/0434; G02F 1/167
USPC ................... 345/107, 215, 690–691; 359/296
See application file for complete search history.

(56) References Cited

U.S. PATENT DOCUMENTS

| 3,612,758 A | 10/1971 | Evans et al. |
| 4,203,106 A | 5/1980 | Dalisa et al. |

(Continued)

FOREIGN PATENT DOCUMENTS

| WO | 2004008238 A1 | 1/2004 |
| WO | 2007105146 A1 | 9/2007 |
| WO | 2007132411 A2 | 11/2007 |

OTHER PUBLICATIONS

Kishi E et al: "Development of In-Plane EPD" 2000 SID International Symposium Digest of Technical Papers. Long Beach, CA, May 16-18, 2000, SID International Symposium Digest of Technical Papers, San Jose, CA: SID, US, vol. 31, May 2000, pp. 24-27, XP001086658.

*Primary Examiner* — Temesgh Ghebretinsae
*Assistant Examiner* — Keith Crawley
(74) *Attorney, Agent, or Firm* — Larry Liberchuk

(57) ABSTRACT

A display device and a method for driving the display device is disclosed. The display device comprises drive circuitry (35) and a plurality of pixels (PIX1, PIX2, PIX3, PIX4, PIX5, PIX6) having movable charged particles (116). The drive circuitry is configured to apply control signals to the pixels to move the charged particles between first (110) and second (112) regions of each pixel in order to alter the optical appearance of each pixel. The method for each pixel comprises a pre-addressing stage (PRA) of moving the charged particles towards the boundary (114) between the first and second regions, and then an addressing stage (ADD) of moving the particles to one side or the other side of the boundary, in dependence on the desired optical appearance of the pixel.

12 Claims, 4 Drawing Sheets

(56) References Cited

U.S. PATENT DOCUMENTS

| | | | |
|---|---|---|---|
| 6,639,580 B1* | 10/2003 | Kishi et al. | 345/107 |
| 8,040,318 B2* | 10/2011 | Duine et al. | 345/107 |
| 2003/0011869 A1* | 1/2003 | Matsuda et al. | 359/296 |
| 2005/0012707 A1* | 1/2005 | Liu | 345/107 |
| 2006/0050362 A1* | 3/2006 | Johnson et al. | 359/296 |
| 2007/0126695 A1* | 6/2007 | Kishi | 345/107 |
| 2010/0002020 A1* | 1/2010 | Roosendaal et al. | 345/690 |

\* cited by examiner

MOVING PARTICLE DISPLAY DEVICE WITH INTERMEDIATE DRIVE ELECTRODE

This invention relates to moving particle display devices, in particular in-plane electrophoretic display devices.

Moving particle displays have been known for many years; for example electrophoretic displays as disclosed in U.S. Pat. No. 3,612,758. The fundamental principle of electrophoretic displays is that the appearance of an electrophoretic medium encapsulated in the display is controllable by means of electrical fields.

To this end, the electrophoretic medium typically comprises electrically charged particles having a first optical appearance (e.g. black) contained in a fluid such as liquid or air having a second optical appearance (e.g. white), the first optical appearance being different from the second optical appearance. The display typically comprises a plurality of pixels, each pixel being separately controllable by means of separate electric fields supplied by electrode arrangements. The particles are thus movable by means of an electric field between visible regions, invisible regions, and possibly also intermediate semi-visible regions. Thereby the appearance of the display is controllable.

The distance that a particle moves through an electrophoretic medium is roughly proportional to the integral of the applied electric field with respect to time. Hence the greater the electric field strength, and the longer the electric field is applied for, the further the particles will move.

A common problem with moving particle displays, such as electrophoretic displays, is their speed of response due to the time required for particles to travel between the various regions of the display.

So called "in-plane" electrophoretic display devices selectively move particles within the electrophoretic medium in directions lateral to the substrate. Typically, each pixel of the display has a viewing region, to which particles may be moved in order to alter the pixel's optical appearance. Applicant's International Application WO 2004/008238 gives an example of a typical in-plane electrophoretic display.

In-plane electrophoretic devices have the advantage that they may be used to implement transflective or transmissive displays, although the particles typically have to travel large in-plane distances lateral to the substrate, and so the speed of response problem may be more severe.

In a simple passive matrix implementation, a display device comprises an array of rows and columns of in-plane electrophoretic pixels. Each pixel of a row has a connection to a respective row electrode, and each pixel of a column has a connection to a respective column electrode. The row electrodes are activated one at a time to write the pixels of each row with the data on the column electrodes. Hence, only one row of pixels are addressed at a time, and so the image update time can extend to hours for a large display with hundreds of rows and columns of pixels.

It is therefore an object of the invention to improve upon the known art.

According to a first aspect of the invention, there is provided a drive method for a display device, the display device comprising a plurality of pixels, each pixel comprising:
a first drive electrode that is associated with a first region of the pixel;
a viewing electrode that is associated with a second region of the pixel;
a second drive electrode that is:
intermediate of the first drive electrode and the viewing electrode;
at the boundary between the first and second regions of the pixel; and
movable charged particles; and
wherein the optical appearance of each pixel is altered by controlling the number of charged particles within the vicinity of the viewing electrode, under the influence of control signals applied to the first and second drive electrodes and the viewing electrode, wherein the method for each pixel comprises:
in a pre-addressing stage, applying control signals to the pixel to move the particles towards the second drive electrode at the boundary between the first and second regions; and then
in an addressing stage, applying control signals to the pixel to move the particles to the first region or to the second region, in dependence on the desired optical appearance of the pixel.

Accordingly, there is provided a driving method that, for each pixel, comprises a pre-addressing stage and an addressing stage. In the pre-addressing stage, particles are moved towards the boundary between the first and second regions, and then in the addressing stage, the pixel is addressed to move the particles to one side or the other side of the boundary between the first and second regions, in dependence on the desired optical appearance of the pixel.

Since the pre-addressing stage may be the same for each pixel, regardless of each pixel's desired optical appearance, there may be no requirement to spend valuable time supplying data to each pixel individually during the pre-addressing stage.

Since particles are moved towards the boundary in the pre-addressing stage, the distance that particles have to move during the addressing stage is reduced, as the particles begin the addressing stage at a position that is already very close to the threshold (boundary) between the first and second regions of the pixel. Hence, due to the reduced distance that particles must travel during the addressing stage, the time for which data must be supplied to each individual pixel may be greatly reduced.

Advantageously, the particles may be moved all the way to the vicinity of the second drive electrode during the pre-addressing stage, thereby further reducing the distance that particles have to travel during the addressing stage.

Alternatively, the particles may be moved towards the second drive electrode during the pre-addressing stage, but not completely within the vicinity of the second drive electrode. This may have advantages in simplifying the control signals that are applied to the pixels during the addressing stages. For example, particles that are moved from the vicinity of the first drive electrode towards the boundary with the second region, but not actually into the second region, may not require further control signals to be applied in the case that all the particles are required to stay in the first region to give the desired optical appearance.

Advantageously, since the pre-addressing stages may be completely independent of the desired optical appearances, and therefore not require data for individual pixels, the pre-addressing stage for a pixel may take place during the addressing stage of another pixel. Hence, the pre-addressing stages may not significantly extend the overall time required to address the pixels, since the pre-addressing stages may take place while other pixels are in the addressing stages.

Additionally, the driving method may further comprise a post-addressing stage after the addressing stage. The post-addressing stage may comprise applying control signals to the pixel such that the particles in the first region move to the vicinity of the first drive electrode, and such that the particles in the second region move to the vicinity of the viewing electrode. Hence, during the addressing stage, particles may only have to be moved a small distance to one side or the other side of the boundary between the first and second regions of the pixel. Hence, due to the small distances, the time for which data must be supplied to each individual pixel may be even further reduced.

Furthermore, since the post-addressing stages may be the same for each pixel, and not require data specific to individual pixels, the post-addressing stage for a pixel may take place during the addressing of another pixel. Hence, the post-addressing stages may not significantly extend the overall time required to address the pixels, since the post-addressing stages may take place while other pixels are in the addressing stages.

Advantageously, the driving method may further comprise an evolution stage that may take place after the post-addressing stage. The evolution stage may comprise applying control signals to all of the pixels, to substantially evenly distribute the particles of each pixel that are within the vicinity of the viewing electrode. Thereby, the uniformity of the distribution of the particles over the viewing electrode, and hence the uniformity of the optical appearance of the pixel, may be increased. Optionally, each pixel may comprise an additional electrode to facilitate the evolution stage. The additional electrode may be situated within the second region and adjacent to the viewing electrode (for example, between the viewing electrode and the second drive electrode). The additional electrodes may all be driven with the same drive signals at the same times to help spread the particles of the pixels over the vicinity of the viewing electrodes.

Additionally, the driving method may further comprise a reset stage before the pre-addressing stage. The reset stage may comprise applying control signals to all of the pixels to move the particles of each pixel to the vicinity of the first drive electrode of the pixel. Hence, the particles may begin their movement from the vicinity of the first drive electrode during the pre-addressing stage, thereby reducing the uncertainty in the particle positions at the end of the pre-addressing stage.

Advantageously, the plurality of pixels may be arranged in an array of rows and columns, the array comprising row and column electrodes. Each row electrode may provide control signals to the pixels comprised within a respective row, and each column electrode may provide control signals to the pixels comprised in a respective column. The row electrodes may be used to scan though the array one row at a time, and each pixel of a row may receive data from a respective column electrode to set the pixels desired optical appearance.

Furthermore, a row of pixels may be in the pre-addressing stage when an adjacent row of pixels are in the addressing stage. Additionally, a row of pixels adjacent to the row of pixels that are in the addressing stage, may be in the post-addressing stage. Hence, the pre-addressing and post-addressing stages may not significantly increase the total time required to address the pixels. Furthermore, the pre-addressing and/or the post addressing stages may last for a longer period of time than the addressing stage. For example, a row may be set in the pre-addressing stage and/or post addressing stage for two or more addressing stage periods. Hence, two or more rows may be in the pre-addressing stage and/or the post addressing stage at the same moment in time.

Additionally, the rows of pixels in the array may be scanned through the pre-addressing, addressing, and post-addressing stages, and the rows of pixels may all be set to the reset stage before the scanning begins, and the rows of pixels may all be set to the evolution stage after the scanning has been completed.

According to a second aspect of the invention, there is provided a display device comprising a plurality of pixels, each pixel comprising:

a first drive electrode that is associated with a first region of the pixel;

a viewing electrode that is associated with a second region of the pixel;

a second drive electrode that is:

intermediate of the first drive electrode and the viewing electrode;

at the boundary between the first and second regions of the pixel; and movable charged particles; and wherein the optical appearance of each pixel is altered by controlling the number of charged particles within the vicinity of the viewing electrode, under the influence of control signals applied to the first and second drive electrodes and the viewing electrode, the display further comprising electronic drive circuitry, the drive circuitry configured for each pixel to:

in a pre-addressing stage, apply control signals to the pixel so as to move the particles towards the second drive electrode at the boundary between the first and second regions; and then in an addressing stage, apply control signals to the pixel so as to move the particles to the first region or to the second region, in dependence on the desired optical appearance of the pixel.

Advantageously, the display device may be an in-plane electrophoretic display. The invention may be particularly advantageously when applied to an in-plane electrophoretic display, due to the large distances that particles typically have to travel to control optical appearance. Of course, the invention is not limited to in-plane electrophoretic displays, and may be applied to many types of displays that use particle movements to control optical appearance, as will be apparent to those skilled in the art.

Embodiments of the invention will now be described, by way of example only, and with reference to the accompanying drawings, in which:

FIGS. 1A and 1B respectively and schematically show cross-sectional and plan diagrams of an in-plane electrophoretic pixel for use in embodiments of the invention;

FIGS. 2A, 2B, 2C, 2D, and 2E show schematic diagrams of a method for driving the pixel of FIG. 1 according to an embodiment of the invention.

The figures are not drawn to scale. Same or similar reference signs denote same or similar features.

Figure 1A:
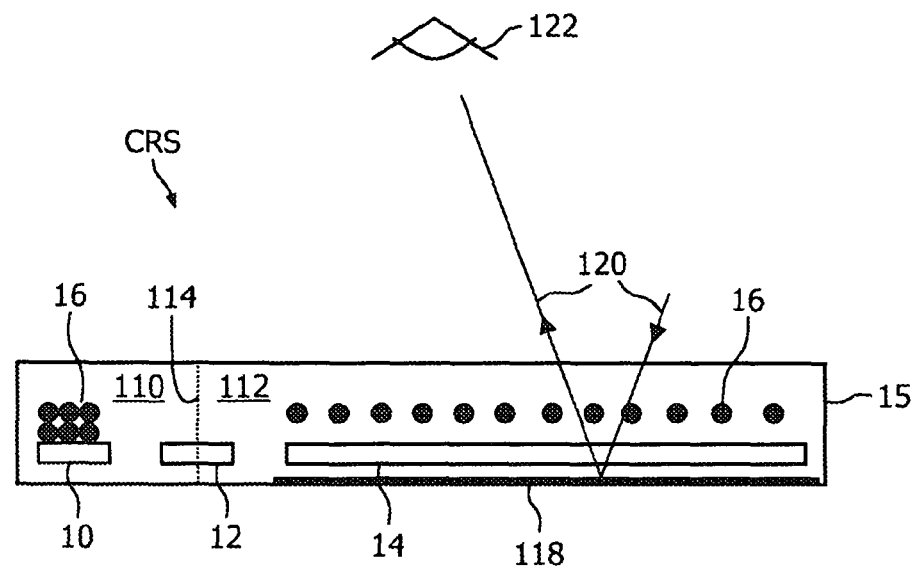
Figure 1B:
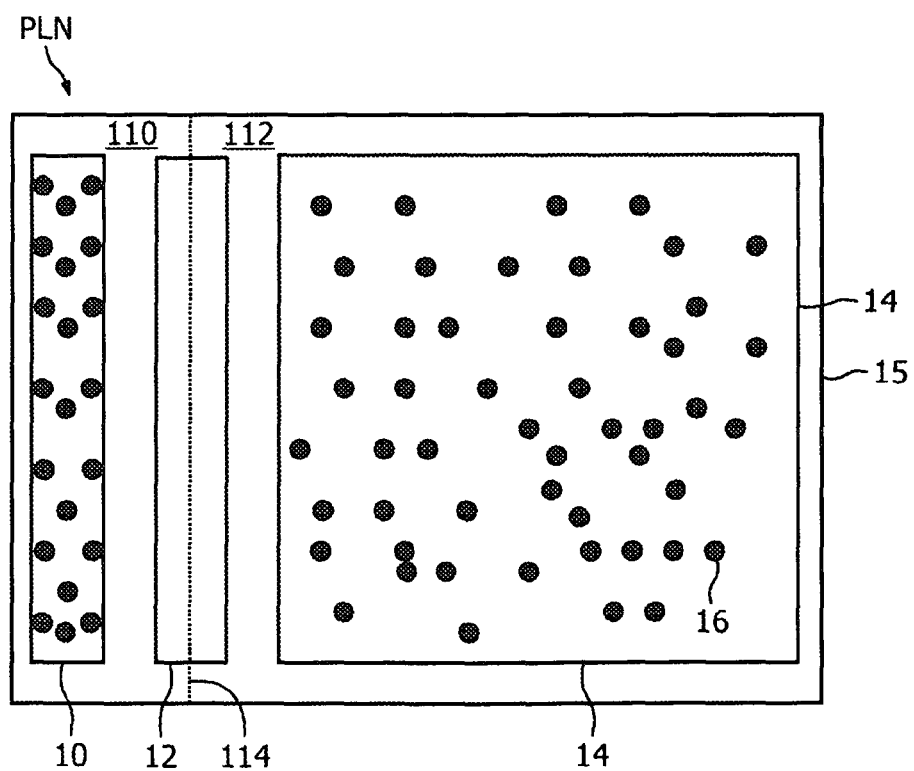

FIGS. 1A and 1B respectively show cross-sectional CRS and plan PLN diagrams of an example of an in-plane electrophoretic pixel for use in embodiments of the invention. The pixel 15 comprises a first drive electrode 10, a second drive electrode 12, and a viewing electrode 14. The pixel 15 further comprises charged black particles 16 that may move under the influence of control signals applied to the first and second drive electrodes and the viewing electrode. These control signals may move the charged black particles 16 between the vicinities of (i.e. the regions of, or the areas directly above or below or immediately adjacent to) the various electrodes. The pixel comprises first 110 and second 112 regions, divided by a conceptual (i.e. imaginary, notional or theoretical) boundary 114, which lies over the second drive electrode 12.

The optical appearance of the pixel 15 is controlled by controlling the number and distribution of particles 116 that are within the vicinity of the viewing electrode 14. The pixel 15 is a reflective pixel, and so comprises a reflecting layer 118 beneath the viewing electrode 14 that reflects light 120 to the viewer 122 to give the display effect. The reflecting layer 118 typically extends over at least the same area as the viewing electrode 14. The more particles that are within the vicinity of the viewing electrode 14, the less light 120 will be reflected back to the viewer, and the darker the pixel will appear. The reflecting layer 118 is not shown on the plan view for clarity. Alternatively, the viewing electrode 14 may be reflective, which may remove the need for the reflecting layer 118.

The particles 116 of the pixel 15 are positively charged, and so will move in the same direction as an applied electric field, i.e. toward the electrode having the lowest electric potential. However, in pixels of other displays the particles 116 may be negatively charged, and so may move in the opposite direction to an applied electric field, as will be apparent to those skilled in the art.

The boundary 114 separates the first region 110 from the second region 112. When the second drive electrode 12 is at a higher electric potential than both the first drive electrode 10 and the viewing electrode 14, the positively charged particles 116 that have a position just to the left of the boundary 114 (within the first region 110) will be attracted towards the first drive electrode 10, and the positively charged particles 116 that have a position just to the right of the boundary 114 (within the second region 112) will be attracted towards the viewing electrode 14.

An embodiment of the invention is now described with reference to FIGS. 2A-2E. These Figures show the particle distributions within the electrophoretic pixel 15 of FIG. 1, at the end of a reset stage RST (shown in FIG. 2A), a pre-addressing stage PRA (shown in FIG. 2B), an addressing stage ADD (shown in FIG. 2C), a post-addressing stage POA (shown in FIG. 2D), and an evolution stage EVL (shown in FIG. 2E). The particles 116 are collectively shown as solid black areas.

Firstly, during the reset stage RST, control signals are applied to the electrodes of the pixel 15 to move all of the particles 116 to the vicinity of the first drive electrode 10. Since the particles 116 are positively charged, they are attracted towards the first drive electrode 10 by applying control signals to make the first drive electrode 10 have a lower electric potential than the second drive electrode 12, and to make the second drive electrode 12 have a lower electric potential than the viewing electrode 14. Alternatively, the second drive electrode and the viewing electrode may be set to the same electric potential, and the first drive electrode set to a lower electric potential.

Figure 2A:
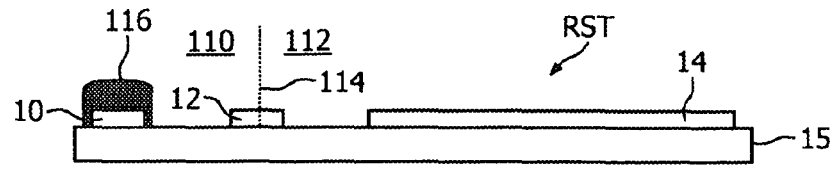

FIG. 2A shows all the charged particles 116 within the vicinity of (i.e. immediately adjacent to) the first drive electrode 10 at the end of the reset stage RST.

The reset stage RST is immediately followed by the pre-addressing stage PRA. During the pre-addressing stage PRA, all the particles 116 are moved towards the second drive electrode 12, until they reach the vicinity of the second drive electrode 12. Since the particles 116 are positively charged, they are moved to the second drive electrode 12 by applying control signals to make the second drive electrode 12 have a lower electric potential than the first drive electrode 10. The control signals are applied to the first and second drive electrodes for just long enough for the particles to reach the vicinity of the second drive electrode 12, such that the electric potential of the viewing electrode 14 may be higher or lower than that of the second drive electrode. Alternatively, the control signals may be applied to the first and second drive electrodes for longer than necessary for the particles to reach the second drive electrode, in which case the second drive electrode should also have a lower electric potential than the viewing electrode, to prevent particles from moving to the vicinity of the viewing electrode during the pre-addressing stage.

Figure 2B:
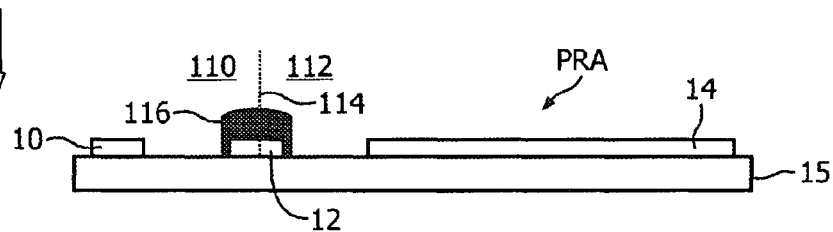

FIG. 2B shows all the charged particles within the vicinity of the second drive electrode 12 at the end of the pre-addressing stage PRA.

The pre-addressing stage PRA is immediately followed by the addressing stage ADD. During the addressing stage ADD, the particles 16 are moved to one side or the other side of the boundary 114, i.e. into the first region 110 or into the second region 112, in dependence on the desired optical state. The distance that each particle 116 has to travel to move to one side or the other side of the boundary 114 is small, and hence the time required for the addressing stage is correspondingly short.

Particles are moved into the second region 112 by applying control signals to the pixel 15 to make the viewing electrode 14 have a lower electric potential than the first 10 and second 12 drive electrodes, thereby attracting particles 116 towards the viewing electrode 14. Particles are moved into the first region 110 by applying control signals to the pixel 15 to make the viewing electrode 14 have a higher electric potential than the first 10 and second 12 drive electrodes, thereby repelling particles 116 away from the viewing electrode 14.

Figure 2C:
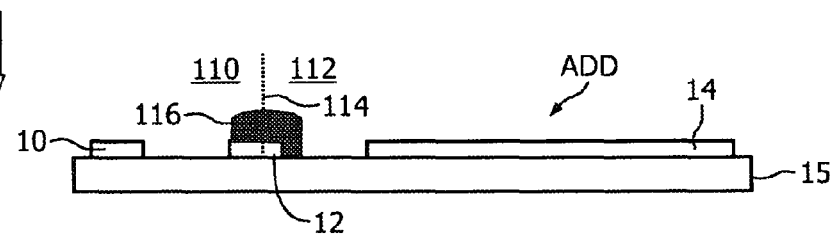

The FIG. 2C diagram at the end of stage ADD shows that the particles 116 have been attracted (by a small distance) towards the viewing electrode 14, leaving one third of the particles 116 within the first region 110, and two thirds of the particles 116 within the second region 112.

The addressing stage ADD is immediately followed by the post-addressing stage POA. During the post-addressing stage POA, the particles 116 that are in the first region 110 are moved to the vicinity of the first drive electrode 10, and the particles that are in the second region 112 are moved to the vicinity of the viewing electrode 14.

The particles are moved by applying control signals to the electrodes of the pixel to make the second drive electrode 12 have a higher electric potential than both the first drive electrode 10 and the viewing electrode 14, thereby repelling particles in the first region 110 towards the first drive electrode, and repelling particles in the second region 112 towards the viewing electrode.

Figure 2D:
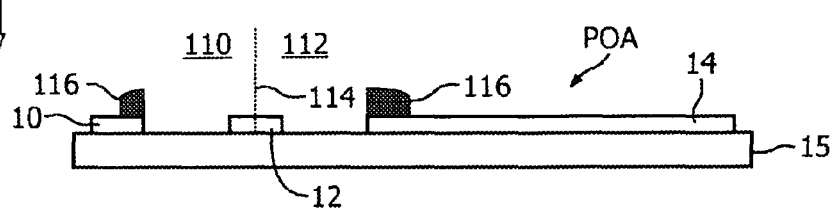

FIG. 2D shows the one third of the particles 116 having been moved (repelled) to the vicinity of (in this case directly above) the first drive electrode 10, and the two thirds of the particles 116 having been moved (repelled) to the vicinity of (in this case directly above) the viewing electrode 14, at the end of the post-addressing stage POA.

The post-addressing stage POA is immediately followed by the evolution stage EVL. During the evolution stage EVL, the particles 116 that have been moved to the vicinity of the viewing electrode 14 are distributed substantially evenly over the viewing electrode 14. This may be achieved by allowing the particles to diffuse (randomly migrate) over the viewing electrode 14 over a period of time, or it may be achieving by applying alternating electric fields between the viewing electrode and the second drive electrode so as to "shake" the particles over the viewing electrode so that they become uniformly distributed.

Figure 2E:
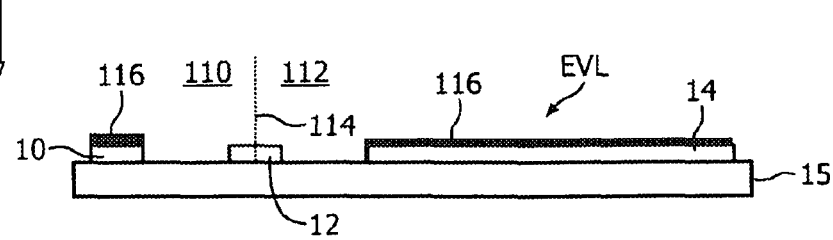

FIG. 2E shows the one third of the charged particles 116 having been uniformly distributed over the first drive electrode, and the two thirds of the charged particles 116 having been uniformly distributed over the viewing electrode, at the end of the evolution stage EVL.

Optionally, each pixel may further comprise an additional electrode situated adjacent to the viewing electrode (for example, between the viewing electrode and the second drive electrode) in the second region. The additional electrode may be driven with control signals to facilitate the distribution of particles over the viewing electrode during the evolution stage.

The reset stage RST is used to collect all of the particles to the first drive electrode 10, so that their positions are known before the pre-addressing stage begins. Then at the end of the pre-addressing stage, the positions of the particles 116 may be more accurately predicted, since all the particles are known to have started within the vicinity of the first drive electrode 10. Being able to accurately predict the positions of the particles at the end of the pre-addressing stage may enable more accurate control of which side of the boundary 114 the particles 116 are moved during the addressing stage.

In an alternative pre-addressing stage, the particles 116 are moved from the vicinity of the first drive electrode 10 towards the second drive electrode 12, but not so far as to move the particles 116 completely within the vicinity of the second drive electrode 12. Hence, at the end of the pre-addressing stage, the particles 116 are still within the first region 110. This has the advantage that none of the particles 116 cross the boundary 114 into the second region 112. Hence, there is less likelihood of particles 116 un-intentionally moving into the second region 112 during the addressing stage and giving errors in the desired optical appearance of the pixel 15.

In a modified drive method, the reset stage is not implemented, and so during the pre-addressing stage the particles 116 may be attracted towards the second drive electrode 12 from both the first drive electrode 10 and the viewing electrode 14. This has the advantage that the pixel's previous optical appearance remains intact right up until the pixel begins the pre-addressing stage. Furthermore, the particles do not have to travel so far to move from the vicinity of the viewing electrode to the vicinity of the second drive electrode, as they do to move from the vicinity of the viewing electrode to the vicinity of the first drive electrode (for the reset stage), and then back towards the vicinity of the second drive electrode. Hence, the time required to set the optical appearance of the pixel can be reduced.

Figure 3:
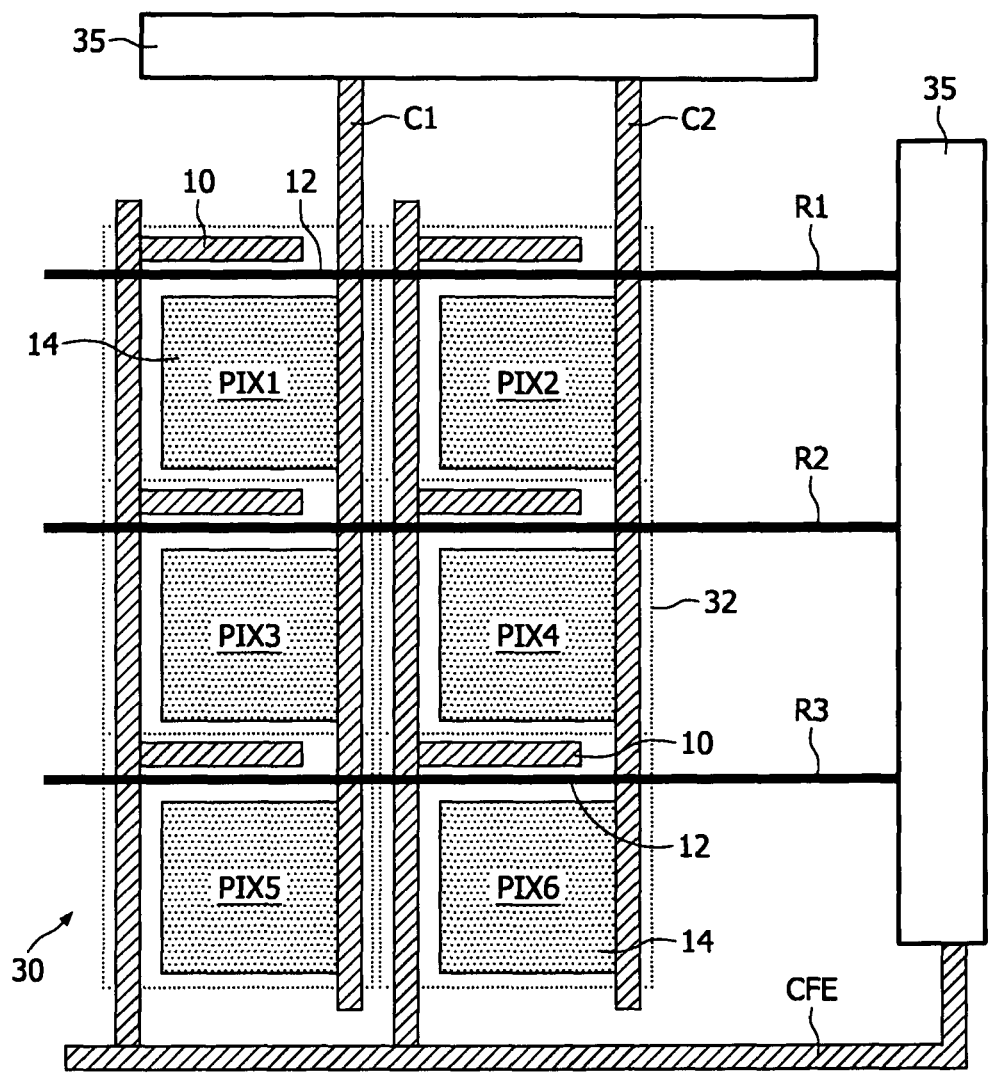
FIG. 3 shows a schematic diagram of an electrophoretic display, comprising an array of six of the pixels of FIG. 1, and electronic drive circuitry according to an embodiment of the invention.

FIG. 3 shows a schematic diagram of an electrophoretic display. A typical electrophoretic display may comprise over a hundred pixels, although for simplicity the display of FIG. 3 comprises an array 30 of just three rows and two columns of the pixels 15 of FIG. 1, and electronic drive circuitry 35. The pixels are labelled as PIX1, PIX2, PIX3, PIX4, PIX5, and PIX6. The pixels are formed between first and second substrates (not shown for clarity) that are spaced apart by pixel dividing walls 32. Each pixel comprises a first drive electrode 10, a second drive electrode 12, and a viewing electrode 14. For clarity, only the electrodes of PIX1 and PIX6 are labelled on the figure.

A common electrode CFE supplies a common control signal to all of the first drive electrodes 10 of the pixels of the array. Each row of pixels is associated with a respective row electrode (R1, R2, R3) that supplies control signals to the second drive electrodes 12 of the pixels of the row, and each column of pixels is associated with a respective column electrode (C1, C2) that supplies control signals to the viewing electrodes 14 of the pixels of the column. The second drive electrodes 12 are effectively formed by portions of the row electrodes R1, R2, and R3.

The column electrodes C1 and C2, the common electrode CFE, the first drive electrodes 10 and the viewing electrodes 14 are all formed on the first substrate. The row electrodes R1, R2 and R3, and second drive electrodes 12, are all formed on the second substrate that is spaced apart from the first substrate by the pixel dividing walls 32 and the electrophoretic medium.

Alternatively, the row electrodes R1, R2 and R3, and second drive electrodes 12, may be formed on the first substrate, being electrically isolated from the other electrodes by crossover insulator layers.

The drive circuitry 35 supplies control signals for driving the R1, R2, R3, C1, C2, and CFE electrodes. The drive circuitry can supply control signals ranging from −10 to +10 volts, although this voltage range will obviously vary according to the voltage requirements of the display pixels that are used.

The drive circuitry 35 here is integrated on the first or second substrates, and comprises Thin Film Transistors (TFTs). Alternatively, the drive circuitry could be a Field Programmable Gate Array (FPGA), an application-specific integrated circuit (ASIC), or any other circuitry configured to generate control signals for driving the pixel array in the specified manner, as will be apparent to those skilled in the art.

The control signals that are applied to the electrodes R1, R2, R3, C1, C2, and CFE by the drive circuitry 35 to set the optical appearances of pixels PIX1-PIX6, will now be described with reference to the timing diagram shown in FIG. 4.

Figure 4:
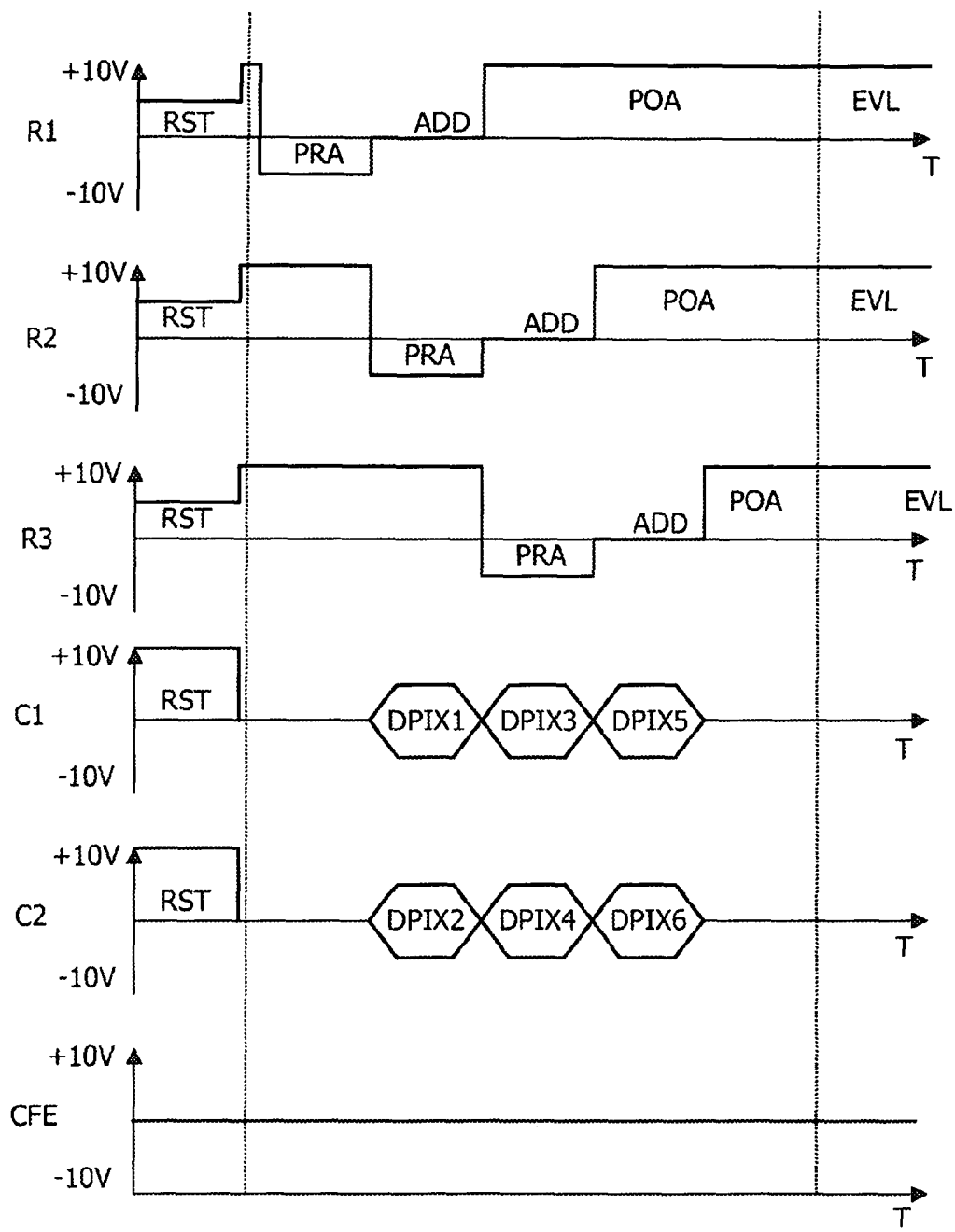
FIG. 4 shows a timing diagram of the control signals for driving the array of pixels of FIG. 3.

The FIG. 4 timing diagram has traces showing the voltages applied to the R1, R2, R3, C1, C2, and CFE electrodes, and the stages for each row of pixels (PIX1 and PIX2, PIX3 and PIX4, PIX5 and PIX6).

The row electrodes are used to step each row of pixels through the different stages, and the column electrodes are used to supply data to set the desired optical appearances of the pixels. In the timing diagram, the voltage levels DPIX1, DPIX2, DPIX3, DPIX4, DPIX5, and DPIX6 are used to set the optical appearance of the pixels PIX1, PIX2, PIX3, PIX4, PIX5, and PIX6 respectively.

Firstly, all of the pixels PIX1-PIX6 are set in the reset stage RST by setting the common electrode CFE to 0V, the row electrodes R1, R2 and R3 to +5V, and the column electrodes C1 and C2 to +10V. Hence, the positively charged particles 116 of each pixel move to the vicinity of the first drive electrode 10 of the pixel. Once the particles 116 have moved to the vicinity of the first drive electrode 10, the row electrodes R1, R2, and R3 are set to +10V and the column electrodes C1 and C2 are set to 0V, thereby holding the particles 116 of each pixel within the vicinity of the first drive electrode 10 of each pixel.

Next, the first row of pixels PIX1 and PIX2 are set in the pre-addressing stage PRA by setting the row electrode R1 to −5V. Hence, the particles 116 of pixels PIX1 and PIX2 move towards the second drive electrodes 12 of pixels PIX1 and PIX2 respectively. The pre-addressing stage lasts just long enough for the particles 116 to move to the vicinity of the second drive electrodes 12 of PIX1 and PIX2.

Next, the second row of pixels PIX3 and PIX4 are set in the pre-addressing stage PRA, and the first row of pixels are set in the addressing stage ADD.

The second row of pixels PIX3 and PIX4 are set in the pre-addressing stage PRA by setting the row electrode R2 to −5V. Hence the particles 116 of pixels PIX3 and PIX4 move towards the second drive electrodes 12 of pixels PIX3 and PIX4 respectively.

The first row of pixels are set in the addressing stage ADD by setting the row electrode R1 to 0V, and by setting the columns C1 and C2 to the voltage levels DPIX1 and DPIX2 respectively. The voltage levels DPIX1 and DPIX2 depend on the desired optical appearances of pixels PIX1 and PIX2 respectively. For example, if the particles 116 of PIX1 are to be moved into the first region, then voltage level DPIX1 is +5V to repel the particles 116 away from the viewing electrode 14. If the particles 116 of PIX1 are to be moved into the second region, then voltage level DPIX1 is −5V to attract the particles 116 towards the viewing electrode 14.

Next, the third row of pixels PIX5 and PIX 6 are set in the pre-addressing stage PRA, the second row of pixels PIX3 and PIX4 are set in the addressing stage ADD, and the first row of pixels PIX1 and PIX2 are set in the post-addressing stage POA.

The third row of pixels PIX5 and PIX6 are set in the pre-addressing stage PRA by setting the row electrode R3 to −5V. Hence the particles 116 of pixels PIX5 and PIX6 move towards the second drive electrodes 12 of pixels PIX5 and PIX6 respectively.

The second row of pixels are set in the addressing stage ADD by setting the row electrode R2 to 0V, and by setting the columns C1 and C2 to the voltage levels DPIX3 and DPIX4 respectively. The voltage levels DPIX3 and DPIX4 depend on the desired optical appearances of pixels PIX3 and PIX4 respectively. For example, if the particles 116 of PIX3 are to be moved into the first region, then voltage level DPIX3 is +5V to repel the particles 116 away from the viewing electrode 14. If the particles 116 of PIX3 are to be moved into the second region, then voltage level DPIX3 is −5V to attract the particles 116 towards the viewing electrode 14.

The first row of pixels are set in the post-addressing stage POA by setting the row electrode R1 to +10V. Hence the particles 116 of pixels PIX1 and PIX2 move towards the first drive electrode 10 or the viewing electrode 14 depending on whether the particles 116 were in the first region 110 or the second region 112 after the addressing stage ADD. For example, if the particles 116 of PIX1 were in the first region 110 after the addressing stage ADD, then setting the row electrode R1 to +10V causes the particles 116 to move to the vicinity of the first drive electrode 10.

Next, the third row of pixels PIX5 and PIX 6 are set in the addressing stage ADD, and the second row of pixels PIX3 and PIX4 are set in the post-addressing stage POA.

The third row of pixels are set in the addressing stage ADD by setting the row electrode R3 to 0V, and by setting the columns C1 and C2 to the voltage levels DPIX5 and DPIX6 respectively. The voltage levels DPIX5 and DPIX6 depend on the desired optical appearances of pixels PIX5 and PIX6 respectively. For example, if the particles 116 of PIX5 are to be moved into the first region, then voltage level DPIX5 is +5V to repel the particles 116 away from the viewing electrode 14. If the particles 116 of PIX5 are to be moved into the second region, then voltage level DPIX5 is −5V to attract the particles 116 towards the viewing electrode 14.

The second row of pixels are set in the post-addressing stage POA by setting the row electrode R2 to +10V. Hence the particles 116 of pixels PIX3 and PIX4 move towards the first drive electrode 10 or the viewing electrode 14 depending on whether the particles 116 were in the first region 110 or the second region 112 after the addressing stage ADD. For example, if the particles 116 of PIX3 were in the first region 110 after the addressing stage ADD, then setting the row electrode R2 to +10V causes the particles 116 to move to the vicinity of the first drive electrode 10.

Next, the third row of pixels PIX5 and PIX6 are set in the post-addressing stage POA by setting the row electrode R3 to +10V. Hence the particles 116 of pixels PIX5 and PIX6 move towards the first drive electrode 10 or the viewing electrode 14 depending on whether the particles 116 were in the first region 110 or the second region 112 after the addressing stage ADD. For example, if the particles 116 of PIX5 were in the first region 110 after the addressing stage ADD, then setting the row electrode R3 to +10V causes the particles 116 to move to the vicinity of the first drive electrode 10.

Finally, the pixels are set in the evolution stage EVL, where the particles that have been moved to the vicinity of the viewing electrodes during the post-addressing stages are given time to evenly distribute over the viewing electrodes. Optionally, the pixel may comprise an additional electrode to facilitate the evolution stage.

As can be seen on FIG. 4, the drive method comprises setting the second row of pixels in the addressing stage ADD while the first row of pixels are set in the post-addressing stage POA, and while the third row of pixels are set in the pre-addressing stage PRA. Hence the pre-addressing and post-addressing stages do not add significantly to the total time required to set the optical appearances for all of the pixels within the array, as they may take place while other pixels are being addressed.

Alternatively, the pre-addressing or post-addressing stages may last for a longer period of time than the addressing stage, and a row may be set in the pre-addressing or post-addressing stages for two or more addressing stage periods. Hence, two or more rows may be in the pre-addressing stage, and/or two or more rows may be in the post-addressing stage, at the same moment in time. For example, the first row of pixels may be in the addressing stage while both the second and third rows of pixels are in the pre-addressing stage.

The exact lengths of times required for the different stages may be altered by altering the drive signal voltages (i.e. the electric field strengths) that are applied to the pixels. This is because higher electric field strengths cause particles to move more quickly, therefore reducing the times needed for the particles to move the required distances, as will be apparent to those skilled in the art.

The voltages applied to the row electrodes during the pre-addressing stages may be increased from −5V to −4V, reducing the electric field strengths between the first and second drive electrodes of the pixels, and so reducing the distances that the particles travel towards the second electrodes during the time allowed for the pre-addressing stage. Hence, the particles may not move all of the way into the vicinities of the second drive electrodes. As discussed earlier, this has the advantage that there is less likelihood of the particles unintentionally moving into the second regions of the pixels and giving errors in the pixels' desired optical appearances.

In summary, there is disclosed a display device and a method for driving the display device. The display device comprises drive circuitry and a plurality of pixels having movable charged particles. The drive circuitry is configured to apply control signals to the pixels to move the charged particles between first and second regions of each pixel in order to alter the optical appearance of each pixel. The method for each pixel comprises a pre-addressing stage of moving the charged particles towards the boundary between the first and second regions, and then an addressing stage of moving the particles to one side or the other side of the boundary, in dependence on the desired optical appearance of the pixel.

Numerous other embodiments falling within the scope of the appended claims will also be apparent to those skilled in the art. For example, there are many different electric potentials to which the various pixel electrodes could be set, in order to move the particles between the first and second regions of the pixels in the manner set out in the appended claims. In particular, the movable charged particles may be negatively charged instead of positively charged, which would require the polarities of the drive signals discussed in the embodiments to be reversed to produce similar particle movements. Reference signs in the claims are not to be construed so as to limit the scope of the claims.

The invention claimed is:

1. A drive method for a display device, the display device comprising a plurality of pixels, each pixel comprising:
    a first drive electrode that is associated with a first region of the pixel;
    a viewing electrode that is associated with a second region of the pixel;
    a second drive electrode that is:
    intermediate of the first drive electrode and the viewing electrode;
    at the boundary between the first and second regions of the pixel; and
    movable charged particles; and
    wherein the optical appearance of each pixel is altered by controlling the number of charged particles within the vicinity of the viewing electrode, under the influence of control signals applied to the first and second drive electrodes and the viewing electrode, wherein the method for each pixel comprises:
    in a pre-addressing stage, applying control signals to the pixel to move the particles towards the second drive electrode at the boundary between the first and second regions; and then
    in an addressing stage, applying control signals to the pixel to move the particles to the first region and to the second region, the respective numbers of particles moved to the first and second regions being in dependence on the desired optical appearance of the pixel;
    in a post-addressing stage, subsequent to the addressing stage, applying control signals to the pixel such that the particles in the first region move to the vicinity of the first drive electrode and that the particles in the second region move to the vicinity of the viewing electrode;
    wherein controls signals for the pre-addressing stage are applied to at least one of the plurality of pixels and controls signals for the addressing stage are applied to at least one other of the plurality of pixels, and wherein the control signals for the pre-addressing stage and the control signals for the addressing stage are applied simultaneously.

2. A drive method according to claim 1, wherein the pre-addressing stage comprises moving the particles towards the second drive electrode until the particles reach the vicinity of the second drive electrode.

3. A drive method according to claim 1, wherein the pre-addressing stage comprises moving the particles towards the second drive electrode, but not completely within the vicinity of the second drive electrode.

4. A drive method according to claim 1, wherein at least one of the plurality of pixels is in the post-addressing stage when at least one other of the plurality of pixels is in the addressing stage.

5. A drive method according to claim 1, further comprising an evolution stage subsequent to the post-addressing stage, the evolution stage comprising applying control signals to all the pixels to distribute the particles of each pixel in the vicinity of the viewing electrode over the vicinity of the viewing electrode.

6. A drive method according to claim 5, further comprising a reset stage that precedes the pre-addressing stage, the reset stage comprising applying control signals to all the pixels to move the particles of each pixel to the vicinity of the first drive electrode of each pixel.

7. A drive method according to claim 6, wherein the plurality of pixels are arranged in an array of rows and columns, the array comprising row and column electrodes, wherein each row electrode provides control signals to the pixels comprised within a respective row, and wherein each column electrode provides control signals to the pixels comprised within a respective column.

8. A drive method according to claim 7, wherein a row of pixels are all in the pre-addressing stage during the time when an adjacent row of pixels are all in the addressing stage.

9. A drive method according to claim 7, wherein the array comprises at least first, second, and third rows of pixels, and wherein the drive method comprises:
    setting the first, second, and third rows of pixels in the reset stage;
    setting the first row of pixels in the pre-addressing stage; and then setting the second row of pixels in the pre-addressing stage; and then setting the third row of pixels in the pre-addressing stage;
    setting the first row of pixels in the addressing stage; and then setting the second row of pixels in the addressing stage; and then setting the third row of pixels in the addressing stage;
    setting the first row of pixels in the post-addressing stage; and then setting the second row of pixels in the post-addressing stage; and then setting the third row of pixels in the post-addressing stage; and
    setting the first, second, and third rows of pixels in the evolution stage.

10. A display device comprising a plurality of pixels, each pixel comprising:
    a first drive electrode that is associated with a first region of the pixel;
    a viewing electrode that is associated with a second region of the pixel;
    a second drive electrode that is:
    intermediate of the first drive electrode and the viewing electrode;
    at the boundary between the first and second regions of the pixel; and
    movable charged particles; and
    wherein the optical appearance of each pixel is altered by controlling the number of charged particles within the vicinity of the viewing electrode, under the influence of control signals applied to the first and second drive electrodes and the viewing electrode, the display further comprising electronic drive circuitry, the drive circuitry configured for each pixel to:
    in a pre-addressing stage, apply control signals to the pixel to move the particles towards the second drive electrode at the boundary between the first and second regions; and then
    in an addressing stage, apply control signals to the pixel to move the particles to the first region and to the second region, the respective numbers of particles moved to the first and second regions being in dependence on the desired optical appearance of the pixel;
    in a post-addressing stage, subsequent to the addressing stage, apply control signals to the pixel such that the particles in the first region move to the vicinity of the first drive electrode and that the particles in the second region move to the vicinity of the viewing electrode;

wherein controls signals for the pre-addressing stage are applied to at least one of the plurality of pixels and controls signals for the addressing stage are applied to at least one other of the plurality of pixels, and wherein the control signals for the pre-addressing stage and the control signals for the addressing stage are applied simultaneously.

11. The display device of claim 10, wherein the display is an in-plane electrophoretic display.

12. An electronic drive circuitry for a display device, the display device comprising a plurality of pixels, each pixel comprising a first drive electrode that is associated with a first region of the pixel; a viewing electrode that is associated with a second region of the pixel; a second drive electrode that is intermediate of the first drive electrode and the viewing electrode and is at the boundary between the first and second regions of the pixel; and movable charged particles; wherein the optical appearance of each pixel is altered by controlling the number of charged particles within the vicinity of the viewing electrode, under the influence of control signals applied to the first and second drive electrodes and the viewing electrode, and wherein the drive circuitry is configured for each pixel to:

in a pre-addressing stage, apply control signals to the pixel to move the particles towards the second drive electrode at the boundary between the first and second regions; and in an addressing stage, apply control signals to the pixel to move the particles to the first region and to the second region, the respective numbers of particles moved to the first and second regions being in dependence on the desired optical appearance of the pixel;

in a post-addressing stage, subsequent to the addressing stage, apply control signals to the pixel such that the particles in the first region move to the vicinity of the first drive electrode and that the particles in the second region move to the vicinity of the viewing electrode;

wherein controls signals for the pre-addressing stage are applied to at least one of the plurality of pixels and controls signals for the addressing stage are applied to at least one other of the plurality of pixels, and wherein the control signals for the pre-addressing stage and the control signals for the addressing stage are applied simultaneously.

* * * * *